Patented Feb. 17, 1942

2,273,094

UNITED STATES PATENT OFFICE 2,273,094

DISAZO DYESTUFFS SOLUBLE IN WATER

Erich Fischer, Bad Soden, Taunus, and Richard Huss, Frankfort-on-the-Main, Germany, assignors to General Aniline & Film Corporation, New York, N. Y., a corporation of Delaware No Drawing. Application November 27, 1940, Serial No. 367,378. In Germany July 10, 1939

5 Claims. (Cl. 260—175)

The present invention relates to disazo-dyestuffs soluble in water, more particularly it relates to dyestuffs corresponding with the following general formula:

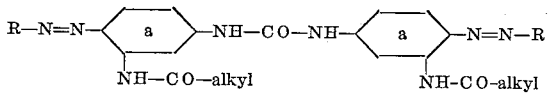

wherein R stands for a radical of the benzene series containing once the group —alkyl—$SO_3H$ and the benzene nuclei $a$ and may contain further substituents.

We have found that valuable water-soluble disazo-dyestuffs are obtained by coupling a diazo-compound from an amine of the benzene series containing once the group —alkyl.$SO_3H$ with an N-mono-acyl-1.3-diaminobenzene which couples in 4-position, and transforming the amino-azo-dyestuff so obtained into the disazo-dyestuff by the action of phosgene in the presence of an acid binding agent.

The expression "group —alkyl—$SO_3H$" is intended to include, for instance, substituents of the following composition:

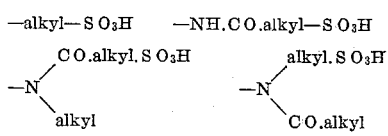

The new dyestuffs dye cellulose fibers yellow to orange tints which are distinguished by good properties of fastness, especially by a good capacity for being discharged.

The following examples serve to illustrate the invention, but they are not intended to limit it thereto, the parts being by weight unless otherwise stated; parts by weight are related to parts by volume as the kilo is to the liter:

(1) 18.7 parts of a 4-(ω-sulfomethyl)-1-aminobenzene (molecular weight: 187) are dissolved in 200 parts by volume of water containing 5.5 parts of calcined sodium carbonate. This solution is run into 25 parts by volume of hydrochloric acid of 20° Bé. and the mixture is diazotized in the presence of ice by means of 6.9 parts of sodium nitrite, whereupon a part of the diazo-compound separates. When the diazotization is terminated the excess of the nitrite is destroyed. A solution of 20 parts of the hydrochloride of 3-acetamino-1-aminobenzene (molecular weight: 186.5) in 250 parts by volume of water is added to the mass and as the coupling proceeds the mineral acid set free is neutralized by slowly introducing drop by drop into the mixture a sodium acetate solution. By stirring for some time in an acetic acid medium, the coupling is finished. The mono-azo-dyestuff obtained is filtered with suction and dissolved in dilute sodium carbonate solution. Thereupon phosgene is introduced while rapidly stirring at 30° C.–40° C., until the amino-azo-dyestuff is no longer detectable, care being taken that by addition of sodium carbonate the solution remains always alkaline. The disazo-dyestuff obtained is separated in the usual manner, filtered with suction and dried. It dyes vegetable fibers greenish yellow tints of good properties of fastness. The dyestuff corresponds with the following formula:

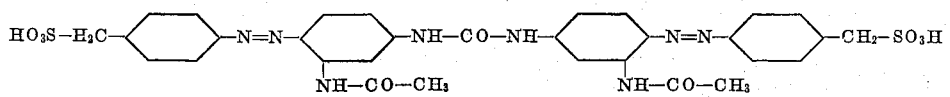

When using instead of 4-(ω-sulfomethyl)-1-aminobenzene, for instance, 3-(ω-sulfomethyl)-1-aminobenzene, 2-(ω-sulfomethyl)-1-aminobenzene or 4-chloro-3-(ω-sulfomethyl)-1-aminobenzene, or instead of 3-acetamino-1-aminobenzene 3-n-propionylamino-1-aminobenzene or 3-acylamino-1-aminobenzenes containing an alkyl group or an alkoxy group in 2-, 5- or 6-position, dyestuffs of similar properties are obtained.

(2) 24.4 parts of 4-(ω-sulfopropionylamino)-1-aminobenzene (molecular weight: 244) are dissolved in 200 parts by volume of water containing the necessary quantity of sodium carbonate. 52 parts by volume of a 2N-sodium nitrite solution are then added and the mixture is slowly introduced, while stirring, into 30 parts by volume of crude hydrochloric acid (20° Bé.) in the presence of ice. When the diazotization is terminated, the excess of sodium nitrite is destroyed and a solution of 20 parts of the hydrochloride of 3-acetamino-1-aminobenzene (molecular weight: 186.5) in 250 parts by volume of water is added to the diazo-solution. After neutralizing the mineral acid with a sodium acetate solution, the coupling is accomplished by stirring for some time at room temperature in an acetic acid medium. The amino-azo-dyestuff obtained is filtered with suction and dissolved in a sodium carbonate solution; into this solution phosgene is introduced, while stirring, at 30° C.–40° C. in the presence of a small excess of sodium carbonate, until the transformation into the disazo-dyestuff is terminated. The dyestuff obtained is suitable for dyeing vegetable fibers clear reddish yellow tints. The dyeings are distinguished by very good fastness to light, to wet-processing and an excellent capacity for being discharged. The dyestuff corresponds with the following formula:

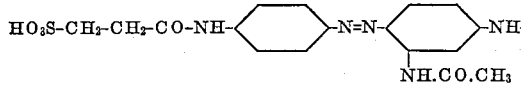

When the 4-(ω sulfopropionylamino) 1-aminobenzene is exchanged, for instance, for 6-chloro-4-(ω-sulfopropionylamino)-1-aminobenzene, 4-(ω-sulfoacetylamino)-1-aminobenzene or a compound of the following constitution:

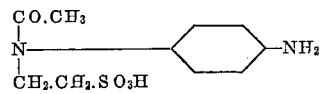

dyestuffs of similar properties are obtained.

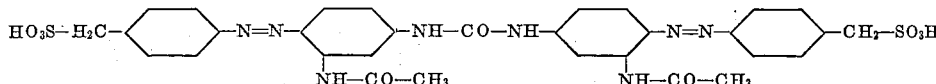

We claim:
1. The water-soluble disazo-dyestuffs of the following general formula:

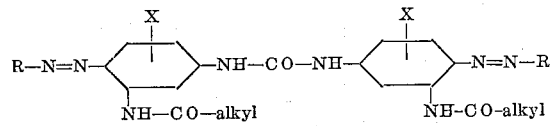

wherein R stands for a radical of the benzene series containing as a substituent a member of the group consisting of

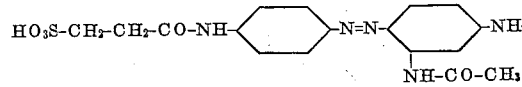

and X stands for a member of the group consisting of hydrogen, alkyl and alkoxy, being yellow to yellow-brown powders which dissolve in water to a yellow to orange solution and dye cellulose fibers yellow to orange tints which are distinguished by good properties of fastness, especially by a good capacity for being discharged.

2. The water-soluble disazo-dyestuffs of the following general formula:

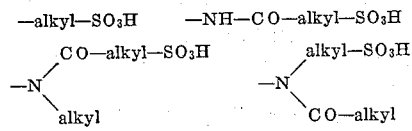

wherein R stands for a radical of the benzene series containing as a substituent a member of the group consisting of

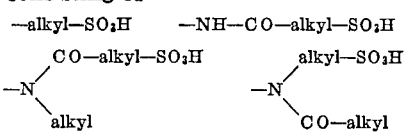

being yellow to yellow-brown powders which

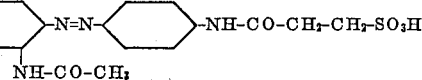

dissolve in water to a yellow to orange solution and dye cellulose fibers yellow to orange tints which are distinguished by good properties of fastness, especially by a good capacity for being discharged.

3. The water-soluble disazo-dyestuff of the following formula:

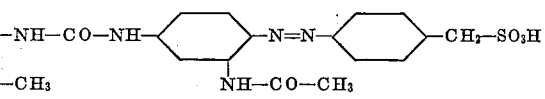

being a yellow powder which dissolves in water to a yellow solution and dyes cellulose fibers greenish yellow tints which are distinguished by good properties of fastness, especially by a good capacity for being discharged.

4. The water-soluble disazo-dyestuff of the following formula:

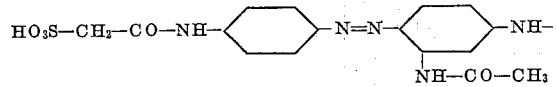

being an orange powder which dissolves in water to an orange solution and dyes cellulose fibers clear reddish yellow tints which are distinguished by very good fastness to light, to wet-processing and a very good capacity for being discharged.

5. The water-soluble disazo-dyestuff of the following formula:

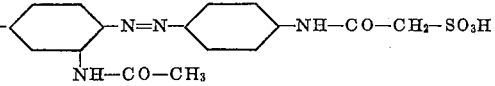

being a reddish yellow powder which dissolves in water to a yellow solution and dyes cellulose fibers middle yellow tints which are distinguished by very good fastness to light, to wet-processing and a very good capacity for being discharged.

ERICH FISCHER.
RICHARD HUSS.